United States Patent [19]
Farrell et al.

[11] Patent Number: 5,764,369
[45] Date of Patent: Jun. 9, 1998

[54] METHOD FOR DETERMINING PORT PAIRINGS OF MACHINE MODULES

[75] Inventors: Michael E. Farrell, Ontario; Paul A. Rulli, Webster, both of N.Y.

[73] Assignee: Xerox Corporation, Stamford, Conn.

[21] Appl. No.: 826,326

[22] Filed: Mar. 27, 1997

[51] Int. Cl.[6] .............. H04N 1/00; G03G 21/14
[52] U.S. Cl. .......... 358/296; 358/406; 395/114; 399/77; 101/486
[58] Field of Search ............ 358/296, 300, 358/400, 401, 406, 407, 468, 500, 501, 503, 530; 395/114; 399/8, 12, 75, 77, 411, 110; 364/131, 148, 550, 650; 101/486

[56] References Cited

U.S. PATENT DOCUMENTS

| | | | |
|---|---|---|---|
| 4,509,851 | 4/1985 | Ippolito et al. | 399/77 |
| 5,164,769 | 11/1992 | Hashimoto et al. | 399/77 |
| 5,363,175 | 11/1994 | Matysek | 399/77 |
| 5,559,606 | 9/1996 | Webster et al. | 358/296 |
| 5,592,881 | 1/1997 | Rabjohns | 101/483 |
| 5,617,215 | 4/1997 | Webster et al. | 358/296 |
| 5,629,775 | 5/1997 | Platteter et al. | 358/296 |
| 5,631,740 | 5/1997 | Webster et al. | 358/296 |
| 5,701,557 | 12/1997 | Webster et al. | 399/77 |

*Primary Examiner*—Peter S. Wong
*Assistant Examiner*—Gregory J. Toatley, Jr.
*Attorney, Agent, or Firm*—Ronald F. Chapuran

[57] ABSTRACT

An electronic image processing apparatus including a controller and a plurality of modules having an arbitrary configuration and being interconnected by input and output ports. The interconnection or port pairings of the modules is determined by the controller by defining ports into input and output sets and defining a given set by logic signals. The logic signals are set to the same level and a logic level change in the logic signals is systematically prompted. The responses from associated ports are identified to map all input and output ports for the image processing apparatus.

18 Claims, 4 Drawing Sheets

METHOD FOR DETERMINING PORT PAIRINGS OF MACHINE MODULES

BACKGROUND OF THE INVENTION

The invention relates to a system architecture, and in particular, to a method for determining port pairings in an arbitrary configuration of marker, feeding and finishing devices in a reproduction machine.

In the electronic printing market, it is becoming more common that a particular printing or copying machine will be custom-designed for a particular customer. While any printer or copier will usually have at least one "marking engine," that is an apparatus which places marks on paper, other equipment essential to the customer's purpose may vary widely. For example, a customer may desire several paper feeders, each feeder capable of feeding a particular size or type of paper or special inserts; or, post-marking equipment, such as staplers, stackers, sorters, and binders, may be desired in different configurations by different customers.

In order to serve the needs of various customers most efficiently, it is desirable that a "modular" architecture for a printing or copying machine be employed. Typically, around a basic marking engine module, a particular customer may purchase only the special equipment desired. Some customers, for example, may require a stacker and a stapler, but have no need for a binder, while another customer may require three separate feeders for feeding three separate types of paper, such as letter size, legal size, and cover stock. With a modular architecture, it is ideal that a customer could simply plug in the extra modules as needed, and then have the system as a whole automatically adapt to the new architecture to use the marking engine with whatever equipment is physically connected to it.

An ideal modular architecture for a printing apparatus would have a control system that could immediately recognize changes in the architecture and instantaneously adapt to the new arrangement, such as when the user rolls up and plugs in, for example, a stapler module. A desirable system would recognize the presence of the new stapler module by the mere fact it had been physically plugged to the rest of the system, and then know under what circumstances to operate the stapler. Great practical difficulties arise, however, in devising a control system which can not only recognize the capabilities of any new equipment plugged into the system, but further which can retain a "topography" of the whole system, recognizing the location and function of each module in the system at a given time. In order to obtain this "topography," a control system must be made aware of the specific location of every module currently plugged in to the system, relative to all other modules in the system.

In known prior-art systems for controlling a large number of modules in a coordinated system such as for printing, it is typical to provide each individual module with a "name" or identification code so that the central control system can address a particular module as needed, in order to carry out a system-wide process. The addressing of individual modules by a central control can be performed either through direct one-to-one wiring between the control system and each individual module, or through an address bus. However, there are certain complications involved with this basic system. Typically there must be a routine, every time the system is turned on or reconfigured, in which the control system polls every available module to which it is connected. However, this does not necessarily provide the geometric interconnection or topography of the whole system. It is also common to have every module have a dedicated identification code, by which it is addressed when operated by the control system. This arrangement can be difficult if two physically identical modules are provided in the same system, as would be provided with two feeder modules each outputting a different type of paper. Derivation of this topography can therefore consume a substantial amount of resources in the controller both when the poll is being conducted, and during the use of the control system in a printing process. A system architecture for attaching and controlling multiple feeding and finishing devices is disclosed in application Ser. No. 08/280,978 filed Jul. 17, 1994 now U.S. Pat. No. 5,629,775 issued May 13, 1997 and assigned to the same assignee as the present invention.

It is also known in the prior art, for example, application Ser. No. 08/520,222 filed Aug. 28, 1995, now U.S. Pat. No. 5,592,881 issued Jan. 14,1997 and assigned to the same assignee as the present invention to provide a unique connection code for each connection between a pair of modules where a physical interaction between modules in the coordinated printing process can occur. An identification code is derived for a module by combining connection codes for a plurality of connections associated with the module. The module is caused to send a derived identification code to a controller and the module is operated by the controller addressing the module by the identification code.

A difficulty with prior art devices is that although a determination of which modules are present on a local network, is possible, it is not possible to resolve the precise physical arrangement of the modules, in particular, to create a schematic representation of potential routes through the machine. It would be desirable, therefore, to provide a method for automatically determining the relationships among several modules in a machine.

It is an object of the present invention, therefore, to be able to dynamically determine the relative position and relationship of each of the modules of a machine or print engine. It is still another object of the present invention to be able to determine the relative relationship of networked modules by indirect control of logic level outputs and monitoring of logic level inputs.

Other advantages of the present invention will become apparent as the following description proceeds, and the features characterizing the invention will be pointed out with particularity in the claims annexed to and forming a part of this specification.

SUMMARY OF THE INVENTION

More particularly, the present invention relates to an electronic image processing apparatus with a controller and a plurality of modules having an arbitrary configuration and being interconnected by input and output ports. The interconnection or port pairings of the modules is determined by the controller by categorizing ports into input and output sets and defining a given set by logic signals. The logic signals are set to the same level and a logic level change in the logic signals is systematically prompted. The responses from associated ports are identified to map all input and output ports for the image processing apparatus.

For a better understanding of the present invention, reference may be had to the accompanying drawings wherein the same reference numerals have been applied to like parts and wherein:

DESCRIPTION OF THE INVENTION

Figure 1:
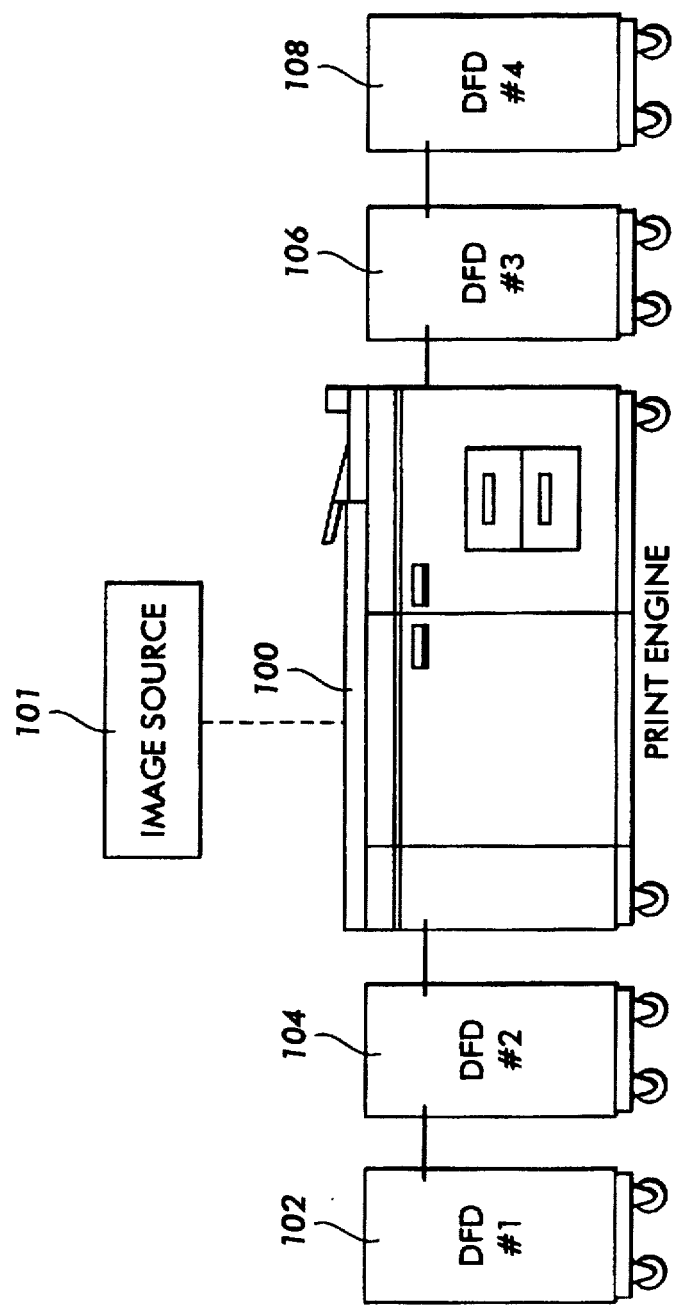
FIG. 1 is a block diagram depicting the physical layout of a typical prior art printing system.

FIG. 1 is a simplified elevational view of a configuration of modules as would be found in a typical high-speed, high-volume electrophotographic printer, configured for a typical purpose. The central module in the system is the marking engine module, here indicated as 100. This marking engine module 100 accepts sheets along a paper path from an external source, and then places marks on the sheet in accordance with electronic or other information supplied from an image source, here indicated as 101. Image source 101 may be either an electronically-controlled system for creating images such as a host computer, a hard-copy digital scanner, or alternately could be part of a light-lens system for direct exposure of the photoreceptor in marking engine module 100. The specific image generated by image source 101 for printing by marking engine module 100 at any particular time will, of course, be dependent on the instantaneous availability of a particular desired sheet fed into marking engine 100.

As shown in FIG. 1, the particular illustrated configuration includes two paper feeder modules, respectively, indicated as 102 and 104. It is typically desirable to have multiple paper feeder modules in a system, either so that one of two sizes of sheets are readily available at any time, or else to have a module dedicated to feeding a particular type of sheet, such as a letterhead sheet, cover stock, tab stock, or transparencies. It is a common application of high-volume printing systems that different feeder modules such as 102 or 104 are called upon within a single print job, such as to interleave tab stock with regular pages, or to supply heavy-bond covers at the front and back of a stack of regular sheets, to form a booklet. It will be noted, in the configuration of FIG. 1, that the printer modules 102, 104 are provided in series along a single paper path P so that, for example, a sheet fed from module 102 will have to pass through module 104 along a paper path in order to reach marking engine module 100.

On the other side of marking engine 100 can be provided any number of different types of "finishing" modules, which are used to assemble loose printed sheets of various types into finished products, such as booklets. Two example finishing modules are shown in FIG. 1. Module 106 is a stapler module which collects sheets fed into it, staples them as required, and then stacks the stapled booklets. Module 108 is a sorter or mailbox module which, in accordance with job ticket instructions associated with a particular print job, can direct a printed sheet from marking engine 100 to one of a plurality of mailboxes. Of course, any number of other types of finishing modules, such as further mailbox modules, heat binders, envelope stuffers, slitters or perforators, etc. can be imagined. It will be noted that the series relationship of finishing modules is the same as with the feeder modules 102, 104: when, for example, stapler module 106 is not required, a sheet moving along paper path simply passes through stapler module 106 untouched and into the desired further module such as 108.

The series relationship of the different feeder and finishing modules in a system requires that a control system recognize the precise relationship among modules in the system, even in situations where a particular module is not being used. For example, if, to print a particular desired print, a sheet must be fed from a stack in feeder module 102 and then after printing sent to a particular mailbox in sorter module 108, the control system must take into account the fact that the sheet must take time to pass through module 104 before printing in module 100, and then pass through stapler module 106 before reaching sorter module 108. In some control system arrangements, unused modules such as 104 and 106 must be controlled to allow the pass-through of certain sheets. In brief, controlling of a modular system requires that the control system always have a basic "topography" of the entire physical system, even in situations where only a subset of the modules in the system are actually being used.

Figure 2:
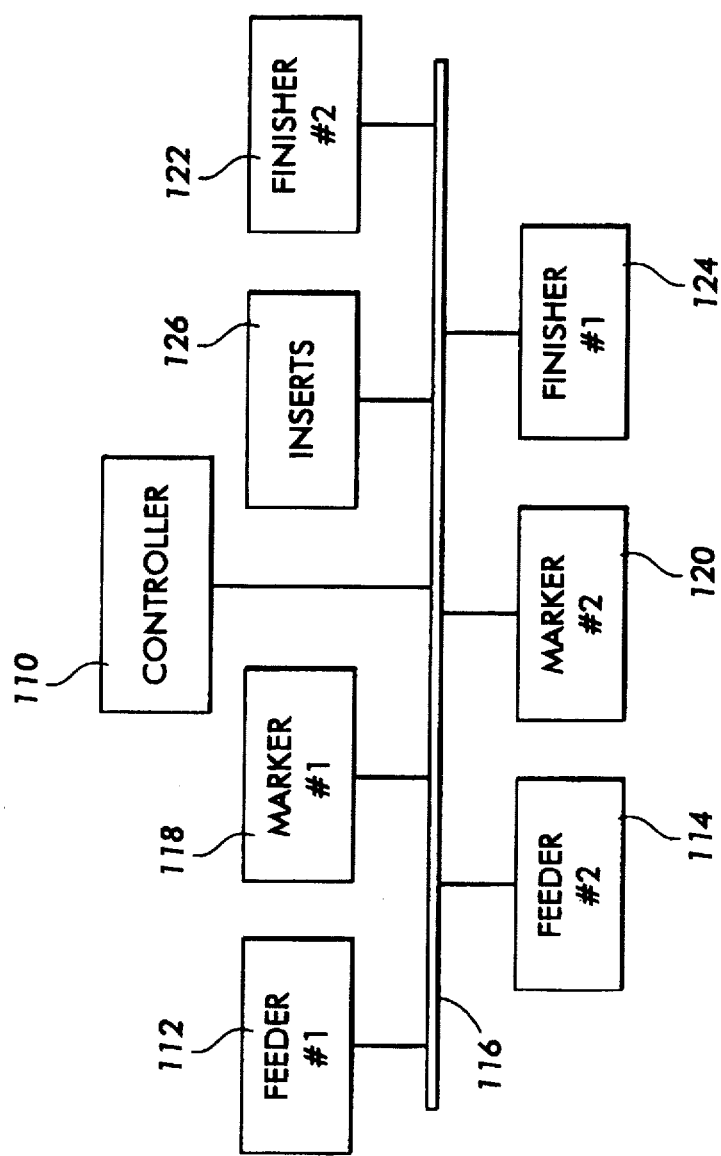
FIG. 2 is a block diagram depicting an arbitrary configuration of a printing system illustrating the present invention.

The control system of the present invention provides a method by which a control system can readily establish a physical topography of a particular configuration of any arbitrary modular printing system. FIG. 2 is an arbitrary modular printing system for illustrating module port pairing in accordance with the present invention. In particular, controller 110 and Feeders 112, 114 are connected to common communication channel 116. Also interconnected to the communication channel 116 are Markers 118, 120, Finishers 122, 124, and Insert Source 126.

As is well known, the feeding devices can be sources of printable media like paper for providing a marker with stock for completion of the printing process or devices which supply image data such as automatic document handlers and recirculating document handlers. Feeding devices also includes devices which provide image data electronically such as a network interface for printers. The finishing devices can be any suitable devices such as sorters, compilers, staplers, folders, or trimmers. It should be noted that FIG. 2 is only one embodiment and meant to illustrate a functional view of the devices rather than actual physical placement. Feeding devices such as paper trays and insert sources supply an increased level of printable stock selection to the printer. This could be for the purpose of having multiple colors of tabs or separator stock or front and rear cover stock with a clear cover sheet. Or it could be a check printing application where there is a variety of scenes pre-printed and each is fed in a collated order to build a check book with the proper cover sheets and rear cover stock.

The feeding/finishing devices can be physically attached to the print engine such that sheets can be feed into the print engine or sheet or sets can be transferred from the print engine to the devices. The devices can be attached to each other such that sheets or sets of paper can be transferred from one device to another. It should be understood that the mechanical specifications of how these devices are connected to the print engine or to one another are not part of the present invention.

Prior art devices are generally in a linear relationship having one print engine with sheet feeder or internal trays up stream and a finisher station downstream as shown in FIG. 1. A need exists to create modules that are capable of standalone operation and are not control dependent to their neighboring modules. The solution is developing autonomous machine modules with standard control, data communication, and physical interfaces, such that each module is indifferent to its neighbor and all modules can be modeled using common techniques. Document Output Terminals (DOT's) would be created by integrating collections of physical machine modules. A machine module is standalone, and makes no assumptions about any other machine module, to enable a liberal mix-and-match of modules. An important aspect of this approach is that all machine modules of a (DOT), whether feeders, markers, or finishers are treated identically, allowing nontraditional configurations such as feeders, post-marking, tandem markers in series or parallel, feeders and finishers only with no marker, etc.

DOT's are composed of one or more machine modules with each machine module having zero or more input ports and zero or more outputs ports. Machine modules accept work units via the input ports and deliver work units via the output ports. Work units are objects that the machine modules perform work on; examples include images, sheets, prints, compilations. A simple feeder module may have one input port to accept sheets from an adjacent machine module and one output port to deliver sheets. A simple marker module will likely have two input ports—one to accept sheets and one to accept images—and one output port to deliver prints. The machine modules exchange command and status information with a controller via a private local area communication network. Using conventional data communication techniques, the controller can establish communications with each machine module and the machine modules in turn can describe themselves to the controller.

In accordance with the present invention although a controller can determine what modules are present on the local area network, it also needs to know the physical arrangement in order to create a machine graph. The machine graph is a schematic representation of the potential routes through the DOT and is used for scheduling purposes. For further details, reference is made to, U.S. Ser. No. 563,317 filed Nov. 28, 1995 now U.S. Pat. No. 5,701,557 issued Dec. 23, 1997 and incorporated herein. Information about the relationships of the machine module ports is required to create the machine graph. Individually, none of the machine modules has knowledge about neighboring modules, hence cannot supply this information.

In accordance with the present invention, a logic level input is associated with ports performing one function (receive or deliver work units) and a logic level output is associated with ports performing the alternate function. For this description, assume logic level inputs are associated with output ports and logic level outputs are associated with input ports. Also, ports either receive work units or deliver work units, but ports do not both receive and deliver work units. Using a machine module interface, the controller queries each machine module for it's state and the module specific information. Examples of module specific information includes, capabilities, constraints, module configuration information, port descriptions, etc. For further details, reference is made to U.S. Pat. No. 5,559,606 incorporated herein.

When all of the machine modules report a completed initialization, i.e. the modules are capable of I/O control and the control system is fully functional, the controller will initiate a port pair mapping routine. The routine consists of the following steps:

1) The controller directs each module to set the logic levels of the logic level output associated with the input port to an off state. (This is analogous to a component control command.)

2) The controller requests the reporting of the initial logic state (on/off) detected at the logic level sensing input associated with each output port and any subsequent changes in logic level state. The logic levels will be reported as an attribute value pair, that is, machine module ID, port, and logic level. The controller will check to ensure that the initial state of all logic levels inputs matches the expected state i.e., all off.

3) The controller will then sequentially direct the toggling of the state of the logic level output associated with each input port. The Controller will accomplish this through explicit instructions(e.g. turn Port on, turn Port Off) sequenced such that not two outputs are on concurrently.

4) The controller concludes by surrendering control of the logic level output associated with the input port back to the machine modules.

Initialization is complete when the machine module port pairing mapping has been established.

There are alternate, but less desirable solutions to the problem of determining module interconnection. For example, a user could specify the port pairings via a user interface or could describe the module arrangement if the port locations on the modules were well described. This approach suffers from the disadvantage, that it does not achieve automated auto configuration. Any user input is prone to error, and reduces user productivity by requiring the user to tend the system during reconfiguration.

A port pair could be established by using a pair of identically keyed connectors—but unique from all others in the DOT. However, each port would need to read the connector keying pattern and report it. This approach suffers from the disadvantages of higher cost, and the reliability risk associated with the key pattern reading device. There is the risk that the connector pairs will become non-identical due to wear or breakage, and risk that the connector pairs will not be unique within the DOT.

The clear advantages of the present invention are that the user merely connects the logic level inputs and outputs with a means for passing the signal (optical fiber, copper, pneumatic tubing, etc.). The logic function is straightforward and hardware implementation is standard. There is single input sensor capability per output port and single output sensor capability per input port. There are no special performance or speed requirements for the hardware. Such a system supports any number of inputs and outputs per machine module. Also there is no need to restrict machine modules to a single input port and single output port, and the system handles any paper path topology.

Figure 3:
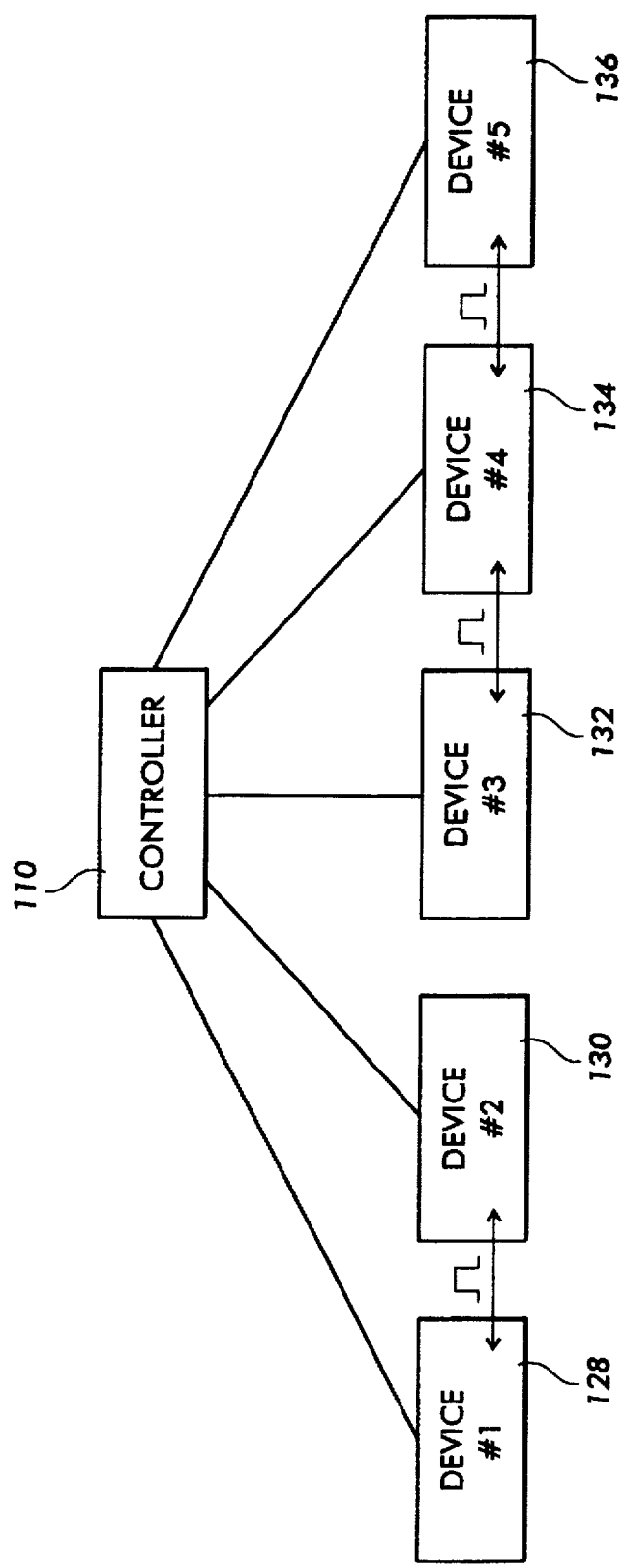
FIG. 3 is a schematic illustrating module port pairing in accordance with the present invention.
Figure 4:
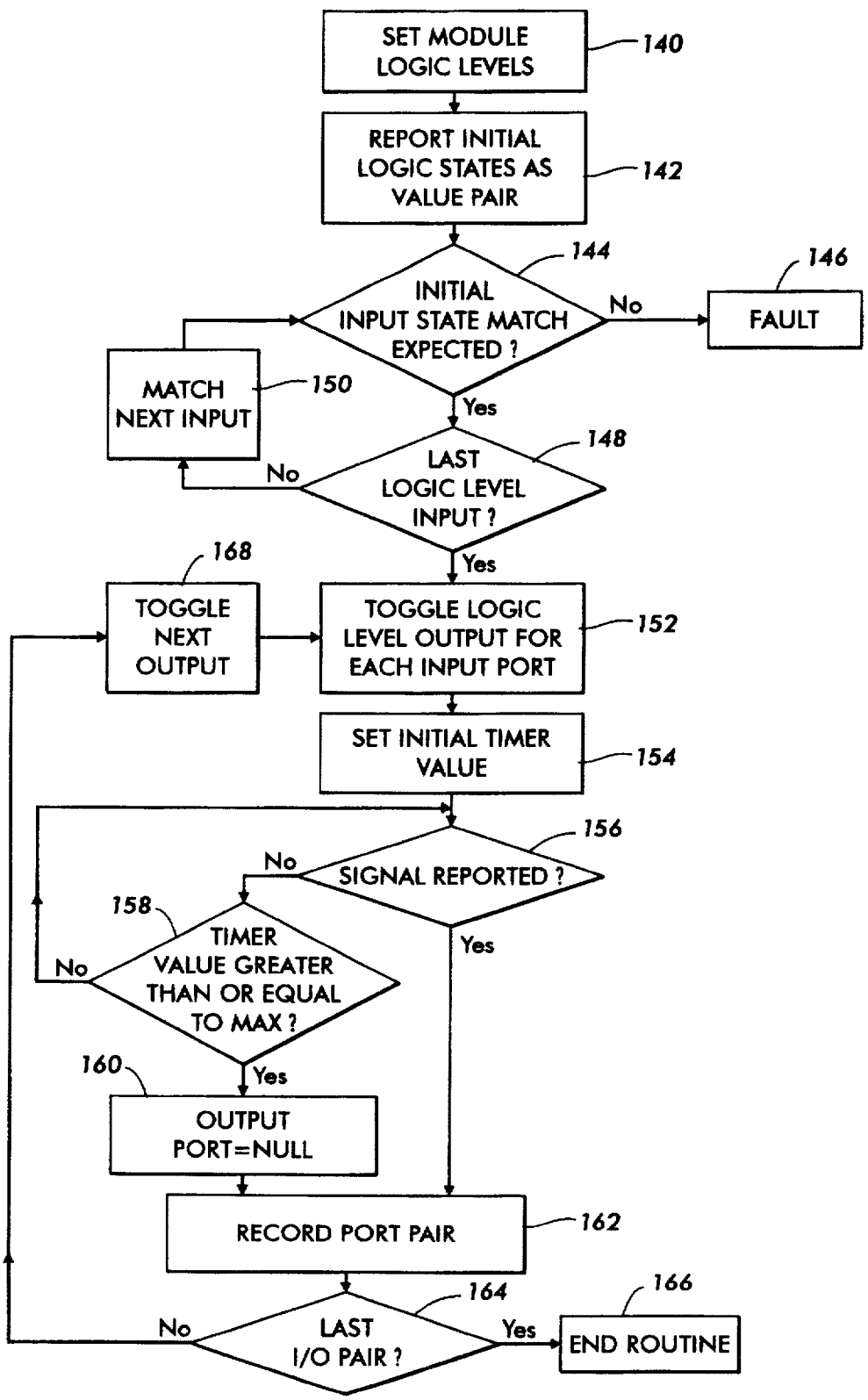
FIG. 4 is a flow chart showing module port pairing in accordance with the present invention.

The determination of port pairings in accordance with the present invention is shown with reference to FIGS. 3 and 4. In particular, FIG. 3 illustrates controller 110 and interconnected to devices 128, 130, 132, 134, and 136 having given input and output ports. To determine the port parings, each module is directed to set the logic levels of the logic level output associated with the input port to an off state as illustrated in block 140 of FIG. 4. The controller requests the reporting of the initial logic state detected at the logic level sensing input associated with each output port and any subsequent changes and logic level state as shown in block 142. The controller will then check to insure that the initial state of all logic level inputs matches the expected state as shown in decision block 144. If an initial input state does not match the expected state, there will be a fault indication as shown in 146.

Each input state will be checked as illustrated in blocks 148 and 150 until all have been checked. At that time, the controller will direct the toggling of logic level outputs associated with each input port as shown in block 152 for each pair as illustrated in blocks 164 and 168 until the routine concludes as shown at block 166. In particular, a toggle logic level output includes setting an initial timer value as shown in block 154. Decision block 156 determines whether or not a signal has been reported. If a signal has been reported, then a port pair is recorded as shown in block 162. If no signal is reported, then there is a determination whether or not a timer value is greater than or equal to a maximum. This is illustrated at block 158. If the timer value is not greater or equal to a maximum, then the procedure repeats the determination whether or not a signal has been reported, shown in decision block 156. If the timer value is greater than or equal to a maximum, then the output port equals null illustrated at block 160, this relationship recorded as a port pair at 162. For each recording of a port pair, there is determination of whether or not this is the last input/output pair, illustrated at decision block 164. If not, the procedure toggles the next output, blocks 168 and 152. If it is the last input/output pair, the routine ends as shown in block 166.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an electronic image processing apparatus comprising a controller and a plurality of modules, the modules being in an arbitrary configuration interconnected by input and output ports, each module having at least one port, a bus for interconnecting the modules to the controller, a method of determining the port pairings of the modules by the controller comprising the steps of:

determining the number of operative modules in the image processing apparatus, defining each input port by a given input port logic signal, setting all input port logic signals to the same level, inducing a logic level change in a first input port signal and identifying a response by a given output port corresponding to the first input port, systematically prompting a logic level change in the input port signals of the remaining input ports, and identifying the responses from associated output ports to map all input and output ports for the image processing apparatus.

2. The method of claim 1 wherein the step of determining the number of operative modules includes the step of receiving alert signals from modules.

3. The method of claim 1 wherein the step of defining each input port by a given input port logic signal includes the step of relating each input port to a distinguishing logic signal.

4. The method of claim 1 wherein the step of inducing a logic level change in a first input port signal and identifying a response by a given output port corresponding to the first input port includes the step of toggling the first input port signal to induce a response in said given output port corresponding to the first input port.

5. The method of claim 1 wherein the step of identifying the responses from associated output ports to map all input and output ports includes the step of recording input/output port pairs by module and port identification.

6. The method of claim 1 wherein the step of identifying the responses from associated ports to map all input and output ports includes the step of recording input/output port pairs by module and port identification.

7. In an electronic image processing apparatus comprising a controller and a plurality of modules, the modules being in an arbitrary configuration interconnected by input and output ports, a method of determining the port pairings of the modules by the controller comprising the steps of:

defining ports into input and output sets and defining a given set by logic signals, setting the logic signals to the same level, systematically prompting a logic level change in the logic signals, and identifying the responses from associated ports to map all input and output ports for the image processing apparatus.

8. The method of claim 7 including the step of determining the number of operative modules in the image processing apparatus.

9. The method of claim 7 wherein the step of defining a given set by logic signals includes the step of relating each port of the set to a distinguishing logic signal.

10. The method of claim 7 wherein the step of systematically prompting a logic level change in the logic signals includes the step of toggling signals from a first set of ports to induce a response from ports in a second set.

11. In an electronic image processing apparatus comprising a controller and a plurality of modules, the modules being in an arbitrary configuration interconnected by input and output ports, a method of determining the port pairings of the modules comprising the steps of:

selecting a first module and identifying a port of the first module providing a given signal, recording a response to the given signal of the first module to identify an associated port of one of the plurality of modules, selecting a second module and identifying a port of the second module providing a given signal, recording a response to the given signal of the second module to identify an associated port of one of the plurality of modules, repeating the steps of selecting and recording for each module of the plurality of modules.

12. The method of claim 11 wherein the step of selecting modules and identifying ports include the step of identifying input ports.

13. In an electronic image processing apparatus comprising a controller and a plurality of modules, the modules being in an arbitrary configuration interconnected by input and output ports, a method of determining the port pairings of the modules comprising the steps of:

sequentially selecting modules and identifying ports, providing port signals, and recording responses to port signals to identify associated port pairs.

14. The method of claim 13 wherein the step of sequentially selecting modules and identifying ports includes the step of identifying input ports.

15. The method of claim 14 wherein the step of recording responses to port signals includes the step of recording responses of output ports.

16. In a compiler apparatus comprising a controller and a plurality of modules, the modules being in an arbitrary configuration interconnected by input and output ports, a method of determining the port pairings of the modules by the controller comprising the steps of:

defining ports into input and output sets and defining a given set by logic signals, setting the logic signals to the same level, systematically prompting a logic level change in the logic signals, and identifying the responses from associated ports to map all input and output ports for the image processing apparatus.

17. The method of claim 16 wherein the step of defining a given set by logic signals includes the step of relating each port of the set to a distinguishing logic signal.

18. The method of claim 16 wherein the step of systematically prompting a logic level change in the logic signals includes the step of toggling signals from a first set of ports to induce a response from ports in a second set.

* * * * *